United States Patent

[11] 3,630,406

| [72] | Inventor | Josef F. Hammes |
| | | St. Louis, Mo. |
| [21] | Appl. No. | 50,633 |
| [22] | Filed | June 29, 1970 |
| [45] | Patented | Dec. 28, 1971 |
| [73] | Assignee | Lowell Manufacturing Company |
| | | St. Louis, Mo. |

[54] UTILITY BOX HOUSING CONNECTED TO A MOUNTING PLATE BY FLANGE AND TAB MEANS
4 Claims, 14 Drawing Figs.

[52] U.S. Cl. .................................................. 220/3.3,
174/48, 174/58, 248/DIG. 6
[51] Int. Cl. ............................................................ H02g 3/10
[50] Field of Search ............................................. 174/48, 49,
50, 53, 58, 65 R, 66; 200/168 D; 220/3.2, 3.3, 3.5,
3.9, 3.92, 3.94; 248/DIG. 6, 205 R

[56] References Cited
UNITED STATES PATENTS

| 1,296,653 | 3/1919 | Griswold | 220/3.2 X |
| 2,344,788 | 3/1944 | Popp | 220/3.3 X |
| 2,480,805 | 8/1949 | Buckels | 174/48 UX |
| 2,620,081 | 12/1952 | Lear, Jr. | 220/3.94 X |
| 2,946,838 | 7/1960 | Bellek | 174/53 |
| 3,365,156 | 1/1968 | Beck | 220/3.9 X |
| 3,388,885 | 6/1968 | Holmes | 174/58 X |

*Primary Examiner*—Laramie E. Askin
*Attorney*—Rogers, Ezell, Eilers & Robbins

ABSTRACT: A utility box adapted to be mounted to the surface of a wall. The box provides an electrical outlet connection and is comprised of a back surface mounting plate adapted to be screwed to the wall surface without cutting into the wall. The mounting plate has a pair of tabs at one end and retaining flanges at an opposite end for interfitting with the box housing with the tabs fitting through opening at one end of the housing and the retaining flanges being screwed into the opposite end of the housing. Conduit knockouts are provided at the box so that the conduit may be fitted into the box and provisions are made for the connection of a faceplate to the box having any desired type of control switch through a simple screw connection of the plate to screw holes provided in the front of the box.

Patented Dec. 28, 1971 3,630,406
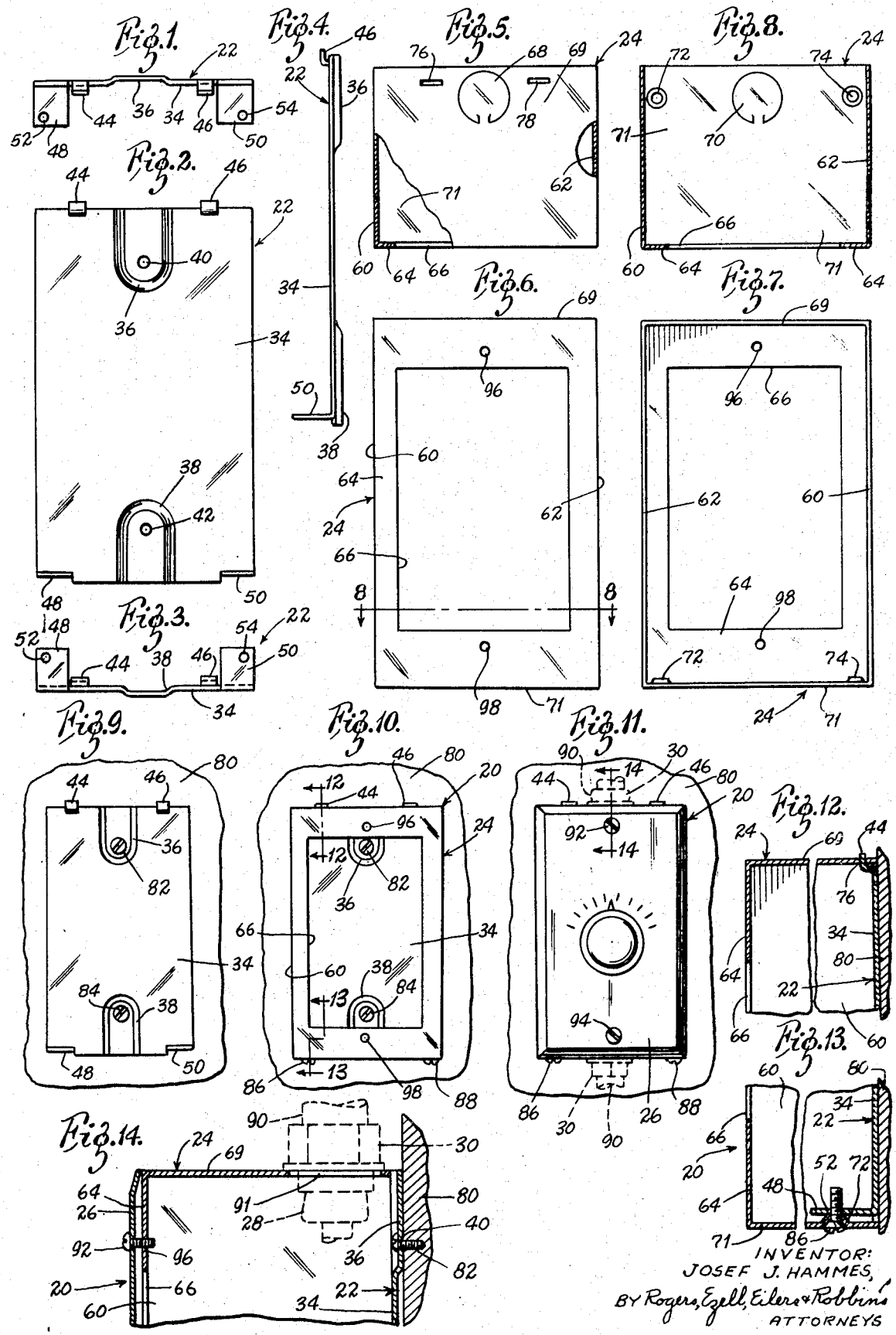
INVENTOR:
JOSEF J. HAMMES,
BY Rogers, Ezell, Eilers & Robbins
ATTORNEYS 3,630,406

UTILITY BOX HOUSING CONNECTED TO A MOUNTING PLATE BY FLANGE AND TAB MEANS

BACKGROUND OF THE INVENTION

In the past, various types of utility boxes have been provided for connection to a wall surface without breaking into the surface. Such boxes provide a connection to an electrical conduit to appropriate switches mounted on the box structure. Such boxes in the past have provided a problem in the connection of the box to a mounting plate and have generally required the provision of bolts to connect the box to the mounting plate, with an interfitting and hunting relation required.

By means of this invention there has been provided a specially constructed mounting plate which can be fastened to a wall surface by screws passing through the plate into the surface of the wall. A specially constructed box housing can then simply be fastened to the mounting plate in a matter of seconds through the provisions of holes at the top of the box interfitting with tabs provided on the mounting plate. With the preliminary fastening of the box to a mounting plate, the box is then registered with retaining flanges at an opposite end of the mounting plate and a self-centering screw connection is provided to secure the box to the retaining flanges.

An electrical conduit can be passed into the box through the conduit knockouts provided at opposite ends of the box housing, such that the box by being positioned vertically or horizontally can accept the conduit from any direction. The conduit can be anchored to the box by a standard male and female socket connector clamping a side of the box to the connector with the conduit passing therethrough. A standard faceplate having any type of desired control switch is fastened to the front of the box by a simple screw connection.

The utility box of this invention can be simply installed to any type of flat wall surface that will receive a screw in a matter of seconds once the mounting plate has been installed on the wall surface. The utility box can be employed by relatively unskilled workmen and is of a strong and durable construction and can be made out of standard sheet metal construction.

The above features are objects of this invention and further objects will appear in the detailed description which follows and will be, otherwise, apparent to those skilled in the art.

For the purpose of illustration of this invention, there is shown in the accompanying drawings a preferred embodiment thereof. It is to be understood that these drawings are for the purpose of example only and that the invention is not limited thereto.

In the drawings:

FIG. 1 is a top plan view of the mounting plate;

FIG. 2 is a front plan view of the mounting plate;

FIG. 3 is a bottom plan view of the mounting plate;

FIG. 4 is a view in side elevation of the mounting plate taken from the right side thereof;

FIG. 5 is a top plan view partially broken away showing the utility box;

FIG. 6 is a front view in elevation of the utility box;

FIG. 7 is a rear view in elevation of the utility box;

FIG. 8 is a view in section taken on the line 8—8 of FIG. 6;

FIG. 9 is a front view in elevation showing the first step in the mounting of the mounting plate to a wall surface;

FIG. 10 is a view in elevation showing the completed mounting of the utility box to the mounting plate on a wall surface;

FIG. 11 is a view taken similarly to FIG. 10 but showing the addition of the face plate to the utility box;

FIG. 12 is an enlarged view in section taken on the line 12—12 of FIG. 10;

FIG. 13 is an enlarged view in section taken on the line 13—13 of FIG. 10; and

FIG. 14 is an enlarged view in section taken on the line 14—14 of FIG. 11.

DESCRIPTION OF THE INVENTION

The utility box of this invention is generally designated by the reference number 20 and is comprised of a mounting plate 22 and a housing 24. A faceplate 26 is adapted to be mounted to the front of the housing and male and female socket connectors 28 and 30 as shown in FIG. 14 are adapted to be clamped to the housing around an electrical conduit fed into the utility box.

The rear mounting plate 22 is best shown in FIGS. 1 through 4. It is comprised of a metal base 34 having a pair of recessed surfaces 36 and 38 at the bottom within which are provided screw holes 40 and 42 which receive a screw connecting the mounting plate to a flat wall surface. A pair of tabs 44 and 46 are struck out from the top of the plate and are formed in an L-shaped fashion in the form of a hook to pass within mating openings in the box housing as will be later described. The retaining flanges 48 and 50 are formed at the bottom of the mounting plate and are provided with openings 52 and 54 which receive securing screws passing through the box to fasten the box to the mounting plate.

The box housing is best shown in FIGS. 5 through 8 and 13. It is formed of a rectangular construction having a pair of sidewalls 60 and 62 and a front 64 which has an opening 66 for access to the interior of the box once the utility box has been mounted. The rear of the box is open as best shown in FIG. 7 so as to fit over the mounting plate. A conduit knockout 68 is provided in the top wall 69 of the box as shown in FIG. 5 and a similar conduit knockout 70 is provided in the bottom wall 71 of the box as shown in FIG. 8 for reception of an electrical conduit. The bottom of the box is further provided with countersunk holes 72 and 74 which fit in registry with the holes 52 and 54 in the retaining flanges on the mounting plate. The top of the box is provided with a pair of openings 76 and 78 which are in registry with and receive the tabs 44 and 46 as best shown in FIG. 12.

INSTALLATION

The utility box of this invention is simply fastened to a wall surface 80 in the steps as shown in FIGS. 9 through 13 by first mounting the mounting plate to the wall by fastening screws 82 and 84 through the screw holes 40 and 42 of the mounting plate. This operation is shown in FIG. 9. Once the mounting plate has been installed, the utility box housing 24 is fitted over the top of the mounting plate with the holes 76 and 78 fitting over the tabs 44 and 46 of the mounting plate in the relationship shown in FIGS. 10 and 12. The box is then secured to the retaining flanges by fastening screws 86 and 88 as shown in FIGS. 10 and 13 through the screw holes 72 and 74 at the bottom of the housing and through the registering screw holes 52 and 54 in the retaining flanges to securely mount the housing to the mounting plate.

After the utility box has been mounted to a wall, the appropriate conduit knockout 68 or 70 is struck out for the insertion of an electrical conduit 90 as shown in FIG. 14. In FIG. 14 the top conduit knockout 68 has been struck out and the conduit has been inserted through the knockout opening 91 and fastened to the box by the conventional male and female coupling 28 and 30.

The utility box is then ready for connection of the standard faceplate 26 by screws 92 and 94 which pass through screw holes 96 and 98 provided on the front of the box housing.

The installation is one that is quite simple to effect and disassembly can be, likewise, simply accomplished when necessary for maintenance or removal or inspection of the interior of the utility box as desired.

Various changes and modifications may be made within this invention as will be readily apparent to those skilled in the art. Such changes and modifications are within the scope and teaching of this invention as defined by the claims appended hereto:

What is claimed is:

1. An electrical utility box for mounting on a wall surface, said box comprising a mounting plate having means for securing the plate to the wall surface and a box housing having a rear opening fitting over the mounting plate, said mounting plate being provided with tab means at one end interfitting with an opening in a first end wall of the housing and retaining flange means adapted to be connected to a second end wall of the housing opposed to said first end wall, said retaining flange means comprising a plurality of flanges struck out perpendicularly from the mounting plate, and screws connected through openings in the second end wall of the housing to said flanges.

2. The utility box of claim 1 in which the tab means comprises a plurality of L-shaped tabs struck out from the mounting plate, and said housing has a conduit knockout in at least one end wall of the housing adapted to receive a male and female connector fastenable to an electrical conduit passing through the knockout opening to the housing.

3. An electrical utility box for mounting on a wall surface, said box comprising a mounting plate having means for securing the plate to the wall surface and a box housing having a rear opening fitting over the mounting plate, said mounting plate being provided with tab means at one end interfitting with an opening in a first end wall of the housing and retaining flange means adapted to be connected to a second end wall of the housing opposed to said first end wall, said utility box having a conduit knockout in at least one end wall of the housing adapted to receive a male and female connector fastenable to an electrical conduit passing through the knockout opening to the housing.

4. An electrical utility box for mounting on a wall surface, said box comprising a mounting plate having means for securing the plate to the wall surface and a box housing having a rear opening fitting over the mounting plate, said mounting plate being provided with tab means at one end interfitting with an opening in a first end wall of the housing and retaining flange means adapted to be connected to a second end wall of the housing opposed to said first end wall, said tab means comprising a plurality of L-shaped tabs struck out from the mounting plate, the retaining flange means comprising a plurality of flanges struck out perpendicularly from the mounting plate, and screws connected through openings in the second end wall of the housing to said flanges.

* * * * *